United States Patent
Campbell et al.

(10) Patent No.: US 7,478,122 B2
(45) Date of Patent: Jan. 13, 2009

(54) WEB SERVER SYSTEM AND METHOD

(75) Inventors: Bill F. Campbell, Toronto (CA); Todd F. Burroughs, Burlington (CA)

(73) Assignee: Hostopia.com Inc.

(*) Notice: Subject to any disclaimer, the term of this patent is extended or adjusted under 35 U.S.C. 154(b) by 671 days.

(21) Appl. No.: 10/918,428

(22) Filed: Aug. 16, 2004

(65) Prior Publication Data

US 2005/0044132 A1 Feb. 24, 2005

Related U.S. Application Data

(60) Provisional application No. 60/495,729, filed on Aug. 18, 2003.

(51) Int. Cl.
*G06F 15/16* (2006.01)

(52) U.S. Cl. ............... 709/203; 709/217; 709/227; 709/230; 709/246

(58) Field of Classification Search ............... 709/203, 709/212, 213, 219, 226, 217, 227, 230, 246
See application file for complete search history.

(56) References Cited

U.S. PATENT DOCUMENTS

| | | | | |
|---|---|---|---|---|
| 6,023,722 | A * | 2/2000 | Colyer | 709/201 |
| 6,182,139 | B1 * | 1/2001 | Brendel | 709/226 |
| 6,286,104 | B1 * | 9/2001 | Buhle et al. | 726/4 |
| 6,336,135 | B1 * | 1/2002 | Niblett et al. | 709/215 |
| 6,654,794 | B1 * | 11/2003 | French | 709/217 |
| 6,775,230 | B1 * | 8/2004 | Watanabe et al. | 370/228 |
| 7,263,689 | B1 * | 8/2007 | Edwards et al. | 717/127 |
| 2002/0065879 | A1 * | 5/2002 | Ambrose et al. | 709/203 |
| 2003/0005297 | A1 * | 1/2003 | Fichtner et al. | 713/168 |
| 2004/0205133 | A1 * | 10/2004 | Adler | 709/206 |
| 2006/0248058 | A1 * | 11/2006 | Feng | 707/3 |
| 2007/0118654 | A1 * | 5/2007 | Jamkhedkar et al. | 709/226 |

* cited by examiner

*Primary Examiner*—Michael Won
(74) *Attorney, Agent, or Firm*—Elias Borges

(57) ABSTRACT

The present invention is a system for running a plurality of different web sites requiring different resource applications wherein each of the resource applications are run in an optimized environment. The system includes a web server having a web server application resident thereon. A plurality of web sites are resident on the web server, the web sites having a plurality of different resource request generators for generating a plurality of different types of resource requests. Each type of resource request requires a particular resource application. A first back end server is operatively coupled to the web server, the first back end server running a first operating environment optimized to run a first group of resource applications resident on the first back end server. A second back end server is operatively coupled to the web server, the second back end server running a second operating environment which is optimized for running a second group of resource applications running on the second back end server, the operating environments running on the first and second back end servers being different. Finally, the system also includes a resource allocation application loaded onto the web server for sending the resource requests to the corresponding resource application.

16 Claims, 3 Drawing Sheets

WEB SERVER SYSTEM AND METHOD

CROSS-REFERENCE TO RELATED APPLICATION

This application claims priority from U.S. Provisional application Ser. No. 60/495,729 filed Aug. 18, 2003, the entirety of which is incorporated herein by reference.

FIELD OF THE INVENTION

The invention relates generally to methods of providing web server services.

BACKGROUND OF THE INVENTION

Web hosting is quickly becoming a commodity. Companies are starting to expect advanced functionality and redundancy at a low price. In order to provide this, a hosting company must share resources among as many sites as possible.

There are basically two general ways of operating a web server. The first is to set up a dedicated or managed server. In this system each company's web site runs on one server. This system is more flexible since it permits custom software to be installed and running on the server in order to perform the functions required by that company's web site. However, this system is expensive to purchase and operate because it requires a separate server for each company web site, and separate maintenance to be performed on that server.

Shared Hosting is the other form by which web sites are hosted. With this type of hosting, many company web sites share one or more servers. This system is generally less flexible because different custom software necessary to run each web site often cannot be installed. This method does have the advantage of being inexpensive, since fewer servers are required and the server maintenance costs are shared.

There are two general approaches to handling Shared Hosting, namely clustered vs. Single server. The single server approach (wherein one single server hosts multiple web sites) is the least expensive approach; however, it is often the least reliable and scalable solution. There is no failure tolerance and scaling means adding more servers and possibly "migrating" web sites between servers. It is difficult to predict the load that a given group of sites will place on a server, so a single server solution is difficult to manage effectively.

In contrast to the single server method, clustering or load balancing a group of servers to server content for all of the sites is much better. Generally, with this approach, all website data is stored on a central file server and the actual serving of pages is handled by a group of machines, configured identically, which pull data from the file server. Some form of load balancing is used to distribute requests among all of the servers. This approach can lead to greater failure tolerance, because if one server stops working, the others take over the load. It is also easier to scale, since more servers can be added at any time.

Some technology does not work well in a clustering environment, since many applications are designed to work on one server only. Examples are ASP, ColdFusion, and JSP. One approach to solving this limitation is to limit customers to one of either the "UNIX" or "Windows" hosting environments (i.e. servers running either a UNIX-like operating system such as Linux or a Windows based operating system). It is common practice to have companies wishing to have their websites hosted to restrict which hosting environment they can have. Commonly, this is stated as "UNIX or Windows" hosting, although it is not limited to these two choices. It is to be understood that throughout this application, the word UNIX refers to any UNIX like operating system such as UNIX™, Linux™, FreeBSD and the like. The term Windows generally refers to the Windows™ family of operating systems and technology produced by Microsoft™.

Once the company has chosen which environment to host their web site, the domain is then hosted on a server (or cluster) which is running the operating system more suited to the type of scripts and applications that the company plans to use. However, once chosen, it can be difficult to switch to the other hosting operating system. This approach reduces a companies choice in technology that they use. If they want to use technologies more suited to a different server setup, they need to purchase another account and run a portion of their site from that account. This is generally more expensive and difficult to maintain.

Web hosting companies that currently offer Windows technologies fall into two classes. First, there are those that offer true Windows hosting, i.e. access to COM components, ASP, and other specialized applications that are parsed and handled only by Microsoft's Internet Information Service (IIS) Webserver. Customers using this technology are given a mutually exclusive choice between UNIX hosting or Windows Hosting. If a user chooses Windows hosting, UNIX features and security become unavailable. Similarly, if a user chooses UNIX hosting, they cannot use ASP, COM objects or other Windows technology.

The other class of hosting companies offer Windows services on UNIX platforms. There are a few products that emulate Windows services on UNIX, thereby providing a good blend of the two environments; however, there are major problems with this approach. First, access to COM objects is not supported, and ODBC connectivity to Windows DBMS systems like MS-SQL is difficult and prone to errors. In addition, advanced features of IIS such as Session management are not available. Finally, DataSource Names (DSNs) are also unavailable. Also, other applications, such as JSP generally require a dedicated server in order to provide security. It is possible to run a few applications (maybe up to a couple hundred) on one server, but it will not scale easily.

SUMMARY OF THE PRESENT INVENTION

The present invention overcomes the drawbacks of the prior art by providing a system for running a plurality of different web sites requiring different resource applications wherein each of the resource applications are running in an optimized environment. The system includes a web server having a web server application resident thereon. A plurality of web sites are resident on the web server, the web sites having a plurality of different resource request generators for generating a plurality of different types of resource requests. Each type of resource request requires a particular resource application. A first back end server is operatively coupled to the web server, the first back end server running a first operating environment optimized to run a first group of resource applications resident on the first back end server. A second back end server is operatively coupled to the web server, the second back end server running a second operating environment which is optimized for running a second group of resource applications running on the second back end server, the operating environments running on the first and second back end servers being different. Finally, the system also includes a resource allocation application loaded onto the web server for sending the resource requests to the corresponding resource application.

The present invention overcomes the drawbacks of the prior art by providing a method of processing incoming resource requests from users. The method includes the steps of first receiving a resource request into a web server, the resource request having a file extension (or MIME type) and then identifying the resource request in a database. The database has a list of resource request file extensions or Mime type cross referenced with a list of locations for a plurality of resource applications, each resource application configured to process resource requests of a particular file extension or MIME type. A first set of the resource applications being resident on a first server operatively coupled to the web server, the first server running an operating system optimized to run the first set of resource applications. A second set of resource applications being resident on a second server operatively coupled to the web server, the second server running a different operating system optimized to run the second set of resource applications. After resource request has been identified, it is forwarded to the application location identified by the database.

DESCRIPTION OF THE DRAWINGS

In the drawings like characters of reference indicate corresponding parts in the different figures.

DETAILED DESCRIPTION OF THE INVENTION

The present invention is a method and a system for running a plurality of different web sites running different applications on a single front-end server or cluster of servers. The system includes a server or server cluster containing a plurality of different web sites, a resource allocation application configured for reading resource requests from the Internet and then handing off the requests to a plurality of back-end servers. Each back-end server is optimized to run specific resource applications which are required by the web sites.

Figure 2:
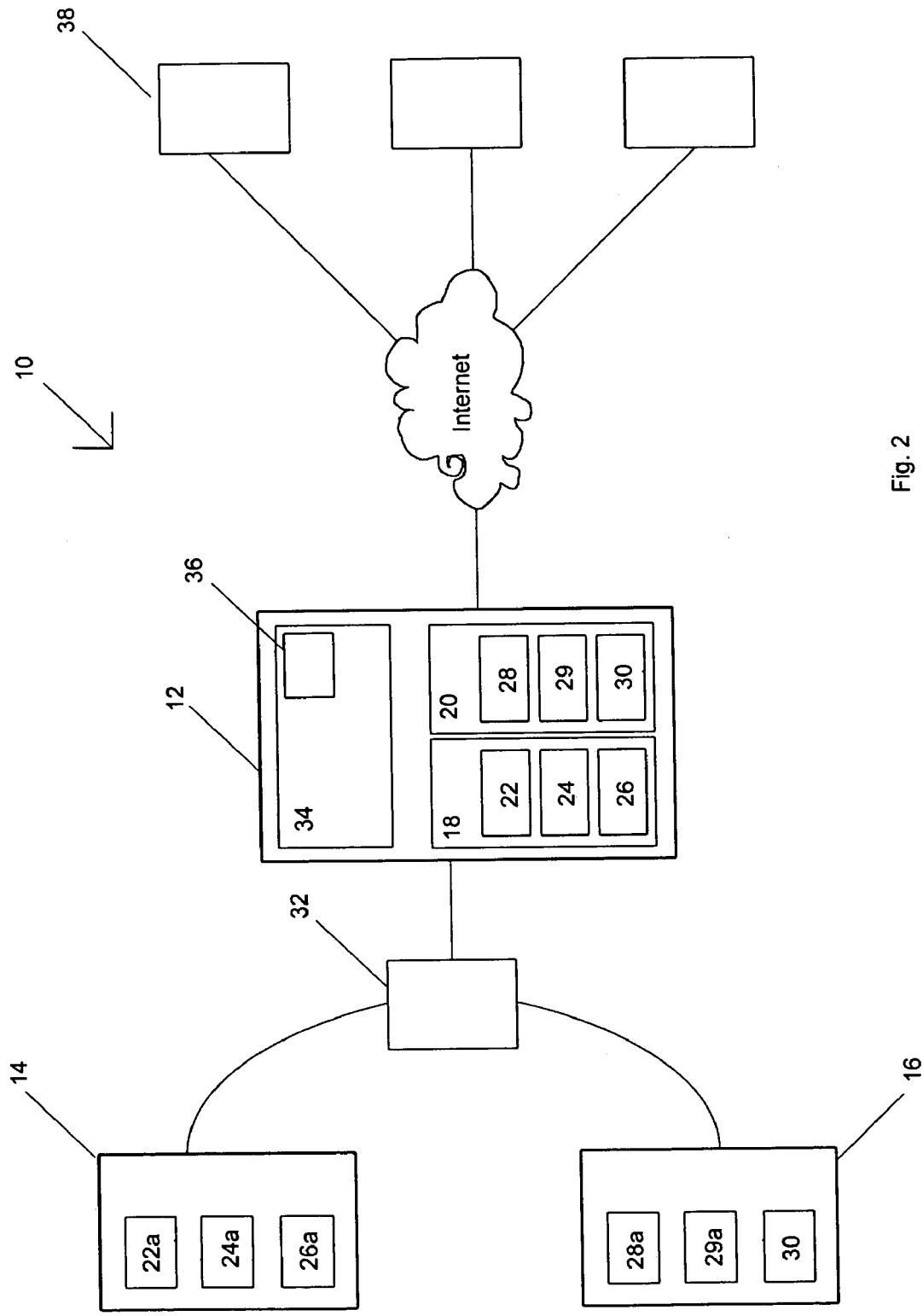
FIG. 2. is a schematic view of one embodiment of the system of the present invention.

A simplified embodiment of the invention will first be discussed with reference to FIG. 2. The system of the present invention, shown generally as item 10, includes a web server 12 and at least two back-end servers, 14 and 16. Loaded onto server 12 are web sites 18 and 20. It will be appreciated that a working system would probably include many more web sites; however, for the purposes of illustration, a simplified system including only two web sites will be considered. Web site 18 has features 22, 24 and 26 requiring applications 22a, 24a and 26a running on a Windows™ platform. Features 22, 24 and 26 are essentially resource request generators which when activated by a user's web browser generates resource requests. For example, web site 18 may have a feature require the running of an Cold Fusion™ application or ASP™ application, when those features (resource request activators) are activated, a resource request is generated for a cold fusion application or ASP application, respectively. Web site 20 has features 28, 29 and 30 which require the running of Unix based applications 28a, 29a and 30a. For example, web site 20 could require the running of Perl scripts or may contain PHP pages which use MySQL database.

Applications 22a, 24a and 26a are loaded onto and run on back end server 14. Back end server 14 runs an operating environment optimized to run applications 22a, 24a and 26a. For example, server 14 could be running the Windows NT™ operating system or Windows 2000 with specific extensions to handle the type of requests. Likewise, applications 28a, 29a and 30a are loaded onto and run on back-end server 16, which runs an operating environment optimized to run those applications. For example, applications 28a, 29a and 30a could be all Unix based applications, in which case, back-end server 16 would be running the appropriate Unix operating system and would be otherwise optimized to run Unix applications. Back end servers 16 and 14 are operatively coupled to server 12 via hub/switch 32.

Server 12 is configured to store and run web sites 18 and 20, and will be provided with a suitable web application server such as Microsoft's™ web application server or a web application server from Apache™. Several suitable web application servers are available from a number of different suppliers. Server 12 is operatively coupled to the Internet and the web server application is configured to receive requests from the Internet. These requests will generally come from web browser applications (not shown) running on user computers 38 coupled to the Internet. These requests will specify specific files resident on the web sites which are hosted on server 12. Each file resident on the web sites will have a specific file type. File types on web hosting systems may be determined by "file extension" or "MIME type", namely the set of characters after the last dot in the filename. This can determine the "MIME Type", so a web browser will know what to do with the file. It can also determine the server side application that should process the file, instead of sending it directly to the user. For example, PHP scripts usually have files ending with .php, .phtml, .php3. ASP scripts end with .asp, .NET ASP scripts end in .aspx, Java Servlets end in .jsp. Based on the file type, the web server software determines what to do with the file. It can send it directly to the user, specifying an appropriate MIME type, it can refuse access to the file completely, or it can process it as appropriate, then send the results of this to the user. If the server needs to process it, it does so internally or by calling another program to perform this function or by sending the request to an application server. Other methods of determining a file type may be possible.

The present invention includes a resource allocation application 34 running on server 12. Resource allocation application 34 may be a stand alone application, or it may be a module added to the web application server. Resource allocation application 34 is configured to analyse resource requests from users 38 to determine the type of file that is being requested. To accomplish this, resource allocation application 34 includes a small database 36 which lists the file types used by all of the applications running on back-end servers 14 and 16, namely applications 22a, 24a, 26a, 28a, 29a and 30a. Database 36 is configured to cross reference each file type with the specific application using that file type and the location of that specific application. Application 34 is configured to read the information request, determine the file type of the requested file, and look up the requested file type in database 34. Application 34 is further configured to pass the file request to the specific application using the file type specified by the file request. Application 34 is further configured to send an error message to the user if the application determines that the requested file is of a type not found in database 36.

It will be appreciated that the web server loaded onto server 12 may have sub-applications which are suited to process the file requests received by the web server. Alternatively, server 12 may have resident applications which may be suited to process the file requests received. Therefore, resource allocation application 34 may pass the file requests to an application resident on server 12. Again, database 36 will have the location of the particular application conforming to the file type contained in the file request.

Application 34 is further configured to determine which web site the file request pertains to. This is accomplished by configuring database 36 to include a list of the domain addresses for the web sites being hosted (i.e. web sites 18 and 20). It will be appreciated that each specific page of each specific web site will have a specific domain address associated therewith. This list of domain addresses is cross referenced within the database to the specific applications loaded on back-end servers 14 and 16 and with the list of file types. Therefore, database 36 will list each file type for any particular domain address and the applications associated therewith. Application 34 is adapted to read the domain address specified in the incoming file request and cross references it to the particular file type and application associated with that domain address. It will be appreciated that an incoming file request may specify a file type that is not associated with a particular domain address. Application 34 is configured to send an error message to user 38 in the event that the file type contained in the user's request does not cross reference in database 36 to the domain address contained in the user's request.

It will be appreciated that once a file request has been forwarded by resource allocation application 34 to a particular application running on back-end servers 14 or 16, the application will then process the request. However, in some cases, the back-end server application may not respond to the request (for example, the particular application may be busy or may not be running correctly). Application 34 is configured to wait a predetermined interval of time for the results from the back-end server application. In the event that the back-end server application does not respond within the predetermined interval of time, then application 34 will send an error message to user 38 indicating that the requested resource is not available.

In the event that the requested server application on the back-end server is available, it will process the file request and generate a result. The back-end application is configured to forward the result to server 12 and the web server loaded on server 12 is configured to forward these results to user 38.

Figure 3:
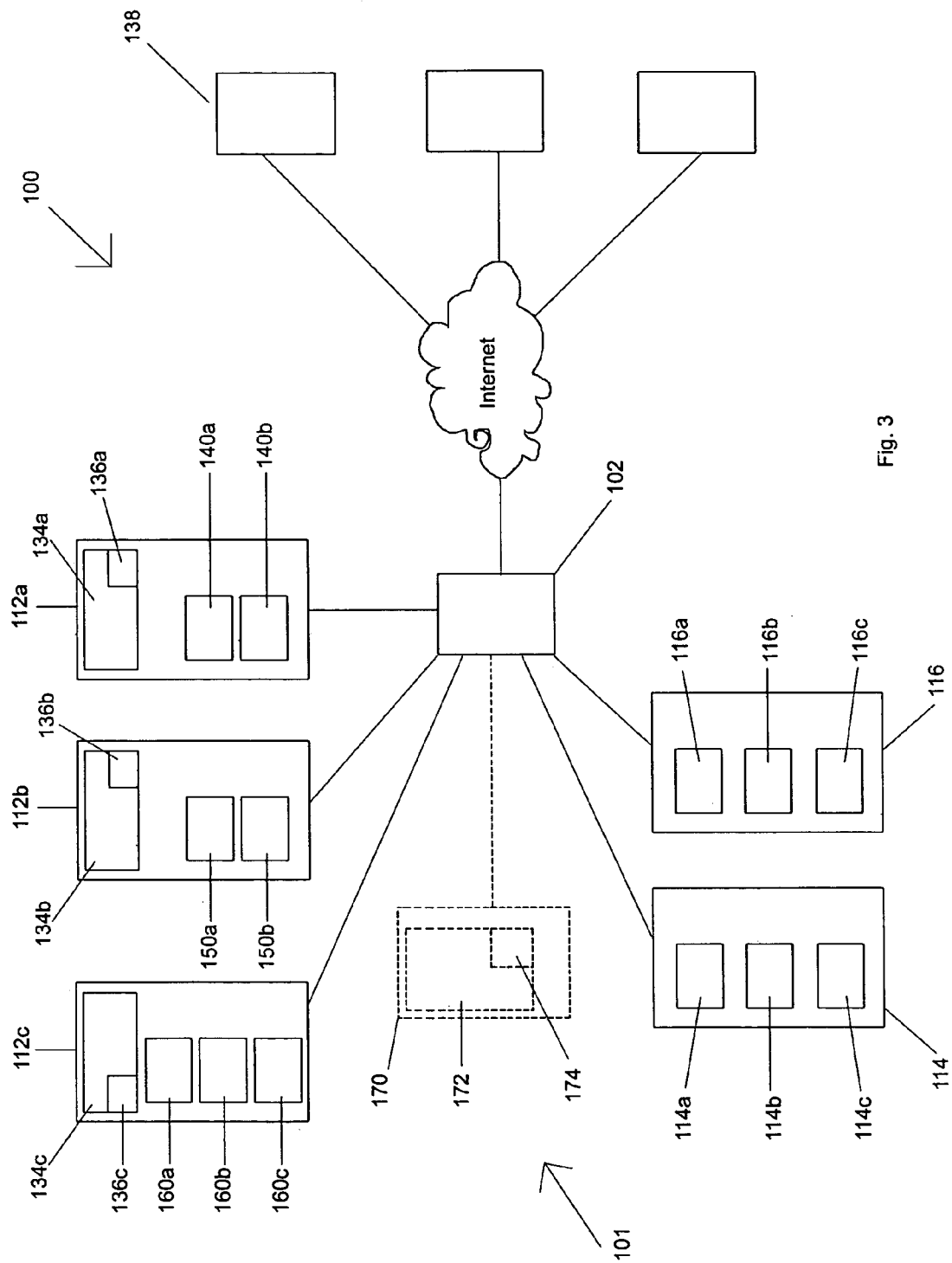
FIG. 3. is a schematic view of an alternate embodiment of the system of the present invention.

Many web hosting providers use clusters of web servers to host client web sites. The present invention is also well suited for use with this approach to web hosting. Referring to FIG. 3, the system of the present invention for use with web server clusters is shown generally as item 100 and includes web servers 112a, 112b, and 112c and back end servers 114 and 116 on network 101. Servers 112a, 112b and 112c are each loaded with a plurality of different client web sites 140a through 160c as illustrated. Each web server is provided with a suitable web server application as in the previous example. Each respective web server also has a resource allocation application (134a, 134b and 134c, respectively). Each web server application is provided with a database (136a through 136c, respectively). Servers 112a, 112b and 112c, applications 134a, 134b and 134c and databases 136a, 136b and 136c are configured identically and have identical functionality to web server 12, application 34 and database 36, respectively, in the previous example (see FIG. 2). Back-end servers 114 and 116 have a plurality of back-end web applications (114a though 114c and 116a through 116c, respectively). Back-end servers 114 and 116 are optimized to run their respective back-end applications. Back-end servers 114 and 116, and applications 114a through 116c, are configured identically and have identical functionality to web servers 14 and 16 and applications 22a through 30, respectively, of the previous example (see FIG. 2).

It is also possible to use a separate server to run a single resource allocation application to serve the entire network. In such a setup, a separate server 170 is optimized to run resource allocation application 172. Resource allocation application 172 has database 174. As in the embodiment shown in FIG. 2, database 174 is configured to include a cross referenced list of all of the domain addresses hosted, the web applications available, and the file types used by each web application. Server 170 and application 172 is further configured to receive all of the incoming web file requests.

Figure 1:
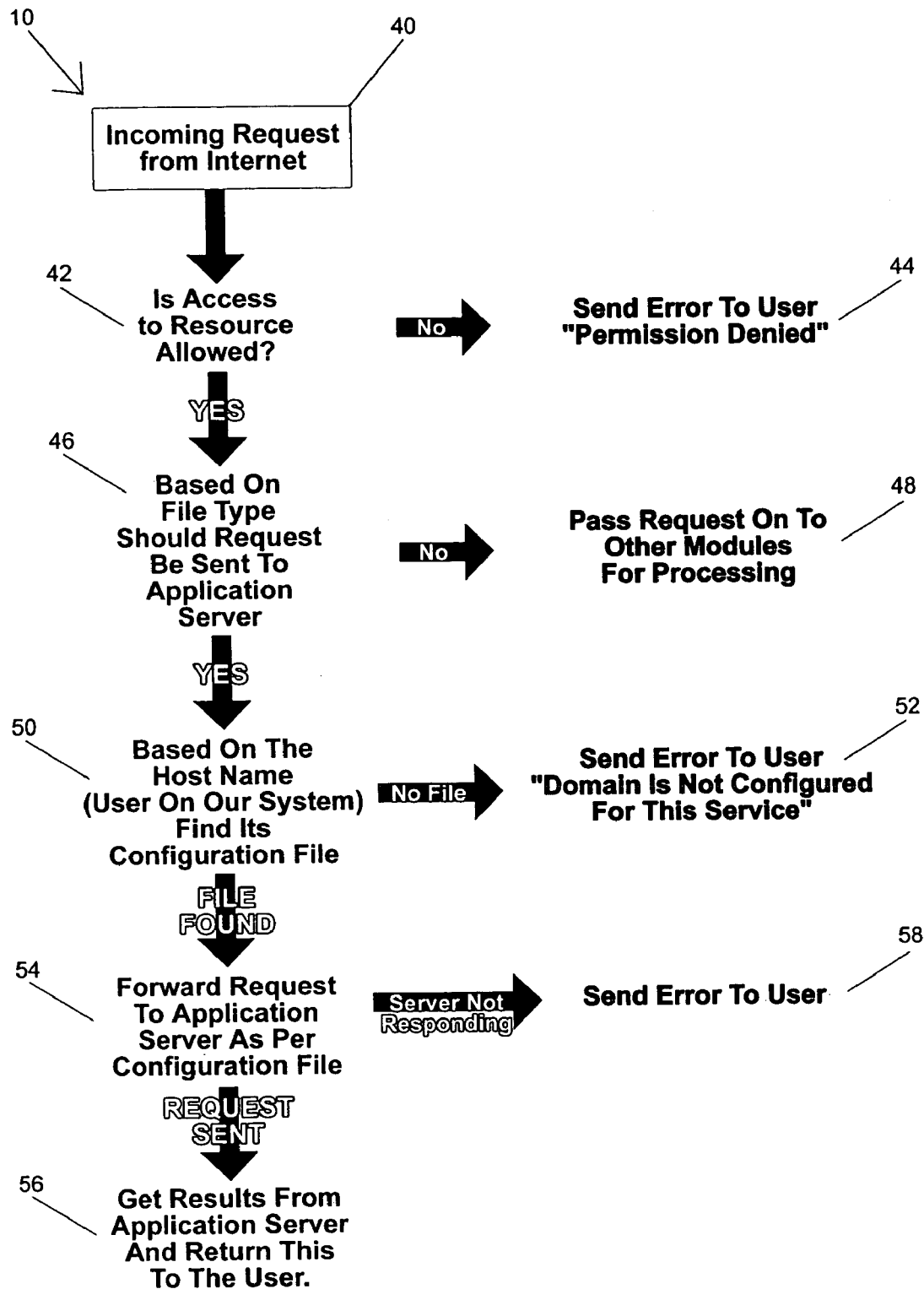
FIG. 1. is a schematic view of the method of the present invention.

The method of how the system processes incoming resource requests will now be discussed with reference to FIG. 1. A user (not shown) sends a file request 40 to system 10. The system then determines if the requested user is allowed access to the system's resources (step 42). This processes is commonly found in most web server applications. If the system's web server determines that the user is not allowed access to the system's resources, the web server then sends error message 44 to the user informing the user that permission to use the systems resources has been denied. If the web server determines that request 40 is to be allowed access, then the system passes the request to step 46 wherein the system examines the request and, based on the file type in the request, determines whether or not the request should be sent to an application resident on the web server or on an application resident on a back-end server. If the system determines that the request contains a file type which is associated with an application resident on the web server, the request is passed to the resident application 48 for processing. However, if the system determines that the request contains a file type which is associated with an application on a back end server, then the system passes the request to step 50. At step 50, the system cross references the file type contained in request 40 with the domain address contained in the request to determine if the back-end server application associated with the file type is listed as an available resource for the domain address. If not, system 10 sends error message 52 to the user indicating that the domain is not configured for the service requested. If the system determines that the back-end application is listed as an available resource for the domain, the system passes the request to step 54. At step 54, the request is passed by the system to the back-end server for processing. If the back-end server application does not respond to the request, then the system forwards error message 58 to the user indicating that the resource is not responding. If the back-end server application is responding, it processes the requests and generates result 56, which the system passes to the user.

The present invention has many advantages over the prior art. Having the system configurable down to the domain level allows the software systems to be scaled as required. Specific domains can be moved to separate servers when the domains get too busy. The present invention also allows for hosting in a shared environment which is normally reserved for a managed server environment. This is accomplished by grouping domains which have similar software requirements together. On a purely shared environment, this is often not possible as software requirements often conflict.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

The invention claimed is:

1. A system for running a plurality of different web sites requiring different resource applications comprising:
   a) a web server configured to run web server applications;
   b) a plurality of first and second types of web sites resident on the web server, the first type of web site configured to generate a first type of resource requests, the second type of web site configured to generate a second type of resource requests;
   c) a first and second back end server operatively coupled to the web server, the first back end server configured to run a first application, based on a first operating environment configured to process the first type of resource requests and the second back end server configured to run a second application on a second operating environment configured to process the second type of resource requests;
   d) a resource allocation application loaded onto the web server, the resource allocation application configured to send resource requests of the first type generated by the web server to the first application on the first back end server, the resource allocation application being further configured to send resource request of the second type generated by the web server to the second application on the second back end server, wherein each type of resource request has a unique file type and wherein the resource allocation application is configured to allocate the resource requests based on the file types of the requests.

2. The system of claim 1 wherein the first back end server and the web server are one in the same.

3. The system of claim 1 wherein the resource allocation application includes a database which lists the file types of each type of resource request and the location of the application corresponding to the type of resource request and wherein the allocation application is configured to forward the resource request to the appropriate resource application by cross referencing the file type of the resource request with the location of the corresponding resource application.

4. The system of claim 3 wherein the resource allocation application is further configured to send an error message if the file extension of the resource request is not listed in the database.

5. The system of claim 3 wherein the resource allocation application is configured to wait a predetermined interval of time for the results of the resource allocation requests forwarded and to generate an error message in the event the resource allocation requests are not processed within the predetermined interval of time.

6. The system of claim 3 further comprising a plurality of web savers, each web server running a web server application, each web server having a resource allocation application resident thereon and each resource allocation application having a substantially identical database, said web servers being operatively coupled to the back end servers.

7. The system of claim 1 further comprising a plurality of web servers, each web server running a web server application, each web server having a resource allocation application resident thereon.

8. The system of claim 1 further comprising a plurality of web servers, each web server running a web server application, each web server having a resource allocation application resident thereon, said web servers being operatively coupled to the back end servers.

9. A system for running a plurality of different web sites requiring different resource applications comprising:
   a) a web server having a web server application resident thereon;
   b) a plurality of web sites resident on the web server, the web sites having a plurality of different resource request generators for generating a plurality of different types of resource requests, each type of resource request requiring a particular resource application;
   c) a first back end server operatively coupled to the web server, the first back end server running a first operating environment, a first group of resource applications running on the first back end server;
   d) a second back end server operatively coupled to the web server, the second back end server running a second operating environment, the second operating environment being different than the first operating environment, a second group of resource applications running on the second back end serve, and
   e) a resource allocation application loaded onto the web server for sending the resource requests to the corresponding resource application, wherein each type of resource request has a unique file extension and wherein the resource allocation application is configured to allocate the resource requests based on the file types of the requests.

10. The system of claim 9 wherein the resource allocation application includes a database which lists the file types of each type of resource request and the location of the resource application corresponding to the type of resource request and wherein the allocation application is configured to forward the resource request to the appropriate resource application by cross referencing the file type of the resource request with the location of the corresponding resource application 11. The system of claim 10 wherein the database further includes the domain portion of the URL of each of the web sites resident on the web server and which type of resource request generators are present on each web site.

12. The system of claim 10 further comprising a plurality of web servers, each web server running a web server application, each web server having a resource allocation application resident thereon and each resource allocation application having an identical database, said web servers being operatively coupled to the back end servers.

13. The system of claim 9 wherein the resource allocation application is further configured to send an error message if the file extension of the resource request is not listed in the database.

14. The system of claim 9 wherein the resource allocation application is configured to wait a predetermined interval of time forte results of the resource allocation requests forwarded and to generate an error message in the event the resource allocation requests are not processed within the predetermined interval of time.

15. The system of claim 9 wherein the web server and the first back end server are one and the same.

16. The system of claim 9 further comprising a plurality of web servers, each web server running a web server application, each web server having a resource allocation application resident thereon, said web servers being operatively coupled to the back end servers.

* * * * *